(12) United States Patent
Buchin

(10) Patent No.: US 9,261,124 B2
(45) Date of Patent: Feb. 16, 2016

(54) CORRUGATED ANGLE BRACKET CONSISTING OF A COMPOSITE MATERIAL

(75) Inventor: Jean-Michel Buchin, Lons le Saunier (FR)

(73) Assignee: SKF Aerospace France, Saint Vallier (FR)

( * ) Notice: Subject to any disclaimer, the term of this patent is extended or adjusted under 35 U.S.C. 154(b) by 226 days.

(21) Appl. No.: 13/877,142

(22) PCT Filed: Sep. 30, 2011

(86) PCT No.: PCT/FR2011/052283
§ 371 (c)(1),
(2), (4) Date: Apr. 4, 2013

(87) PCT Pub. No.: WO2012/042183
PCT Pub. Date: Apr. 5, 2012

(65) Prior Publication Data
US 2013/0209162 A1    Aug. 15, 2013

(30) Foreign Application Priority Data

Sep. 30, 2010  (FR) ...................................... 10 57935

(51) Int. Cl.
*F16B 12/46* (2006.01)
*B29C 33/48* (2006.01)

(52) U.S. Cl.
CPC .............. *F16B 12/46* (2013.01); *B29C 33/485* (2013.01); *Y10T 403/42* (2015.01)

(58) Field of Classification Search
CPC . F16B 12/46; Y10T 403/42; Y10T 403/4602; Y10T 403/35
USPC ............ 248/220.1, 220.41–220.43; 403/179, 403/205, 231, 286, 401, 402
See application file for complete search history.

(56) References Cited

U.S. PATENT DOCUMENTS

| | | | | |
|---|---|---|---|---|
| 3,831,338 | A * | 8/1974 | Klingensmith et al. | 403/400 |
| 4,067,168 | A * | 1/1978 | Thurner | 52/854 |
| 6,015,123 | A * | 1/2000 | Perez et al. | 248/220.1 |
| 6,754,992 | B1 * | 6/2004 | Byfield et al. | 52/36.5 |
| 7,065,932 | B2 * | 6/2006 | Roesset et al. | 52/712 |
| 7,226,027 | B1 * | 6/2007 | Feeley | 248/220.1 |
| 8,122,537 | B1 * | 2/2012 | Roberts | 5/400 |
| 2010/0192506 | A1 * | 8/2010 | Allred et al. | 52/655.1 |

FOREIGN PATENT DOCUMENTS

WO    2010 072952 A1    7/2010

* cited by examiner

*Primary Examiner* — Daniel P Stodola
*Assistant Examiner* — Jonathan Masinick
(74) *Attorney, Agent, or Firm* — Andrew W. Chu; Craft Chu PLLC

(57) ABSTRACT

The invention relates to an angle bracket including a composite material for connecting parts. The angle bracket has two wings forming an angle along a longitudinal folding axis and coupling regions on the outside of the fold. The coupling regions attach to parts to be connected, and is associated with a securing means. At least in the longitudinal direction, the angle bracket has at least one succession of domed sections with a concave or convex profile on the inside and/or outside of the fold, providing the bracket with a corrugated form in the longitudinal direction.

12 Claims, 1 Drawing Sheet

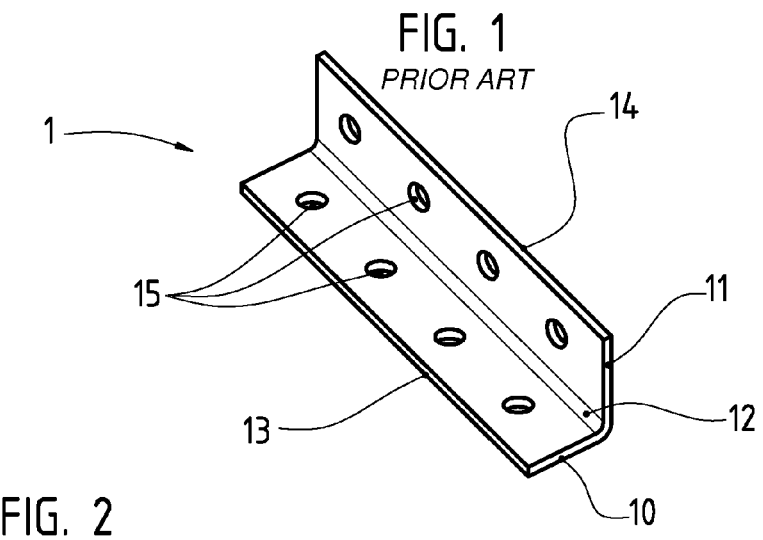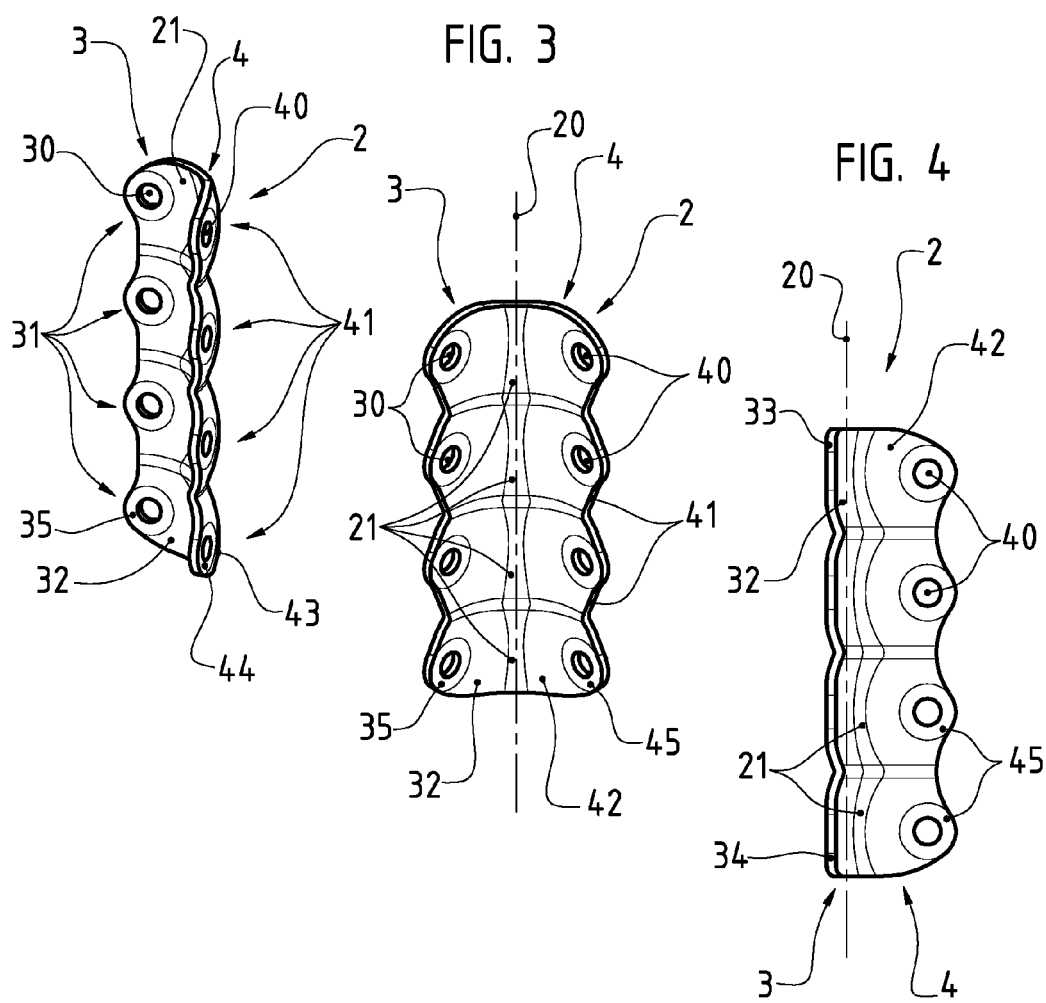

CORRUGATED ANGLE BRACKET CONSISTING OF A COMPOSITE MATERIAL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates, in the field of the composite materials, to an angle bracket aimed at connecting parts forming an angle between them.

Such an angle bracket made of composite material is essentially, but not restrictively, for use in the field of aeronautics, for example for connecting two or more parts, or for reinforcing an angle, over a determined joining length, and in substitution of similar angle brackets hitherto made of metal. These angle brackets are aimed at being made integral with the parts to be connected, and are thus provided on the outside of the fold with coupling regions aimed at permitting the fastening of said parts to be connected, in association with securing means, which may non-restrictively consist of gluing, riveting or screwing means.

2. Description of Related Art Including Information Disclosed Under 37 CFR 1.97 and 37 CFR 1.98.

A state-of-the-art angle bracket is represented in FIG. 1. This angle bracket 1 includes two wings 10 and 11, which form between them a right angle according to a longitudinal folding axis 12, the outer faces 13 and 14 of which form the coupling regions, while a multiplicity of holes 15 arranged in the wings 10 and 11, on both sides of said folding axis 12, are aimed at permitting the fastening of the parts to be connected through securing means.

The substitution of the metallic angle brackets by angle brackets made of composite material is essentially dictated by the necessity of weight saving. Generally, the angle brackets made of composite material are manufactured according to the so-called "black metal" technique, which consists in molding a composite material in the shape and dimensions of the angle brackets made of metal they are aimed at substituting. This has sometimes drawbacks at the level of the strength, even when the composite material being used is advantageously formed of reinforcing fibers embedded in a thermoplastic or thermosetting matrix.

It is indeed known that the weak spot of the composite materials is the matrix, which has a specific strength much lower than that of the fibers. The strength range is for example 20 MPa for the resin and 4000 Mpa for the carbon fiber. Therefore, the failure mode of a part made of composite material is generally a fracture of the resin connecting the fibers, and for an angle bracket made of composite material the fracture is observed essentially during an unfolding operation, i.e. the spreading of the two wings.

In order to cope with this drawback, it would be appropriate that the reinforcing fibers are subjected to the tensile and/or compression forces, and that the resin is not or little stressed.

From WO2010072952 is known an L-shaped fitting resulting from the molding of a composite material, which comprises two portions forming an angle between them, and drilled with holes in order to permit to make two parts integral with each other through fastening means, at least one of said two parts having, on the inside of said fitting, a concave curved profile, and in particular a spherical or cylindrical profile, the hole or holes provided in same having an axis radial to the curvature.

This configuration permits the reinforcing fibers, or part of the latter, to be oriented in the direction of traction and/or compression, so that they are stressed by priority with respect to the resin.

However, such an L-shaped fitting does not permit to substitute an angle bracket for assembling, with the desired rigidity, two parts forming an angle between them. Indeed, though an L-shaped fitting is also aimed at making integral two parts forming an angle between them, an angle bracket permits in addition to perform such a uniting over a determined joining length, whereby said parts may for example consist of panels.

It could be contemplated to juxtapose several of these L-shaped fittings, so as to obtain an aggregate of parts extending over the length of the joining of two parts to be assembled. Though the result achieved, at the level of the resistance to a folding or unfolding stress, i.e. when closing or opening the angle, is obviously better than the one that could be achieved with traditional angle brackets, the same does not apply as regards the strength in the longitudinal direction, parallel to the folding axis. Indeed, the L-shaped fittings of the aggregate are not connected to each other, except by said very parts, which do not necessarily have a high rigidity.

SUMMARY OF THE INVENTION

The aim of the present invention is to provide an angle bracket made of composite material aimed at connecting parts forming an angle between them, and permitting to cope with the various above-mentioned drawbacks, namely to provide a folding and unfolding strength, while being rigid in the longitudinal direction, irrespective of the rigidity characteristics of the parts to be connected.

The angle bracket for connecting parts, made of composite material according to the invention, includes two wings forming an angle between them according to a longitudinal folding axis and including, on the outside of said fold, coupling regions aimed at permitting the fastening of the parts to be connected, in association with securing means, and it is essentially characterized in that it has at least one succession, at least in the longitudinal direction, of domed portions with a concave or convex profile on the inside and/or outside of said fold, which provide same with a shape in the longitudinal direction.

According to an additional feature of the angle bracket made of composite material according to the invention, the coupling region of a wing is separated from the coupling region of another wing by at least one domed portion.

According to an additional feature of the angle bracket made of composite material according to the invention, the coupling region or regions are each made at the level of a region that is convex on the outside of the fold.

According to an additional feature of the angle bracket made of composite material according to the invention, the succession or successions of domed portions also extend according to a transversal and/or oblique alignment passing from one wing to the other one.

According to a particular embodiment of the angle bracket made of composite material according to the invention, each of the wings is formed of a succession, in the longitudinal direction, of regions with a concave profile on the inside of the fold, each of said regions with a concave profile of a wing being connected to a region with a concave profile of the other wing through an intermediate region, also with a concave profile on the inside of said fold.

According to an additional feature of the particular embodiment of the angle bracket made of composite material according to the invention, the regions with a concave profile connected by an intermediate region with a concave profile are arranged in front of each other with respect to the longitudinal folding line.

According to an additional feature of the angle bracket made of composite material according to the invention, the securing means consist of means for securing by screwing or riveting, to this end the coupling regions are drilled with holes, the axis of each of which is radial to the curvature of the domed portion in which it is made.

According to another additional feature of the angle bracket made of composite material according to the invention, each of the holes is provided in a portion that has, on the outside of the fold, a flat face forming a coupling plane.

According to another additional feature of the angle bracket made of composite material according to the invention, the wall on the outside of the fold of at least one wing is flat.

According to another additional feature of the angle bracket made of composite material according to the invention, the flat outer wall consists of the outer wall of an element molded onto the wing.

According to another additional feature of the angle bracket made of composite material according to the invention, each of the holes is provided in a portion that has, on the inside of the fold, a flat face forming a resting plane for the means for making integral.

According to another additional feature of the angle bracket made of composite material according to the invention, the longitudinal folding line is curved or angulate.

The advantages and features of the angle bracket made of composite material according to the invention will become clear from the following detailed description, which refers to the attached drawing, which represents a non-restrictive embodiment of same.

BRIEF DESCRIPTION OF THE DRAWINGS

FIG. 1 represents a schematic perspective view of an angle bracket of the state of the art.

FIG. 2 represents a schematic perspective view of a first embodiment of an angle bracket made of composite material according to the invention.

FIG. 3 represents a schematic perspective view according to another angle of the same angle bracket according to the invention.

FIG. 4 represents a schematic plan view of the same angle bracket according to the invention.

DETAILED DESCRIPTION OF THE DRAWINGS

When referring to FIGS. 2, 3 and 4, we can see a first embodiment 2 of an angle bracket made of composite material according to the invention.

This angle bracket 2 includes, in a known way, two wings 3 and 4, forming between them an angle according to a folding axis 20, in this case it is, non-restrictively, a right angle.

Each of the wings 3 and 4 includes a multiplicity of holes 30 and 40, respectively, in this case non-restrictively four, aligned longitudinally and aimed at receiving securing means such as for example bolts or rivets, etc. . . . , According to the invention, the angle bracket 2 has a particular geometry aimed at providing same an increased strength.

Thus, each of the holes 30 and 40, respectively, is made in a domed portion 31 and 41, respectively, which has, on the inside of the angle bracket 2, a concave profile 32 and 42, respectively, and on the outside a convex profile 33 and 43, respectively. Each of the wings 3 and 4 is thus formed of a succession, in the longitudinal direction, of domed portions 31 and 41, respectively.

The axis of each of the holes 30 and 40 is radial to the curvature of the domed portion 31 and 41, respectively, in which it is made. Each of the domed portions 31 and 41 has, at the level of the periphery of the hole 30 and 40, respectively, it includes, on the one hand on the outside of the angle bracket 2, a flat coupling face 34 and 44, respectively, aimed at forming a resting plane for the part to be fixed and, on the other hand, on the inside of the angle bracket 2, a plane face 35 and 45, respectively, aimed at forming a resting plane for the fastening means, not shown, for each of the holes 30 and 40, respectively, the flat coupling face 34 and 44, respectively, being parallel to the inner flat face 35 and 45, respectively.

Non-restrictively, the flat faces 34, 35, 44 and 45 have the shape of a ring concentric to the hole 30 and 40, respectively.

Since each wing is aimed at being applied against a flat part, the flat coupling faces 34 are all in the same plane, while the flat coupling faces 44 are also in one and the same plane, these two planes forming, in the case represented, a right angle between them, whereby it should be known that it perfectly possible, in variants not shown, that the angle formed by the two planes is different from a right angle.

Furthermore, each of the domed portions 31 is positioned in front, with respect to the axis 20, of a region 41, and these neighboring domed portions 31 and 41 are connected by a domed intermediate portion 21, with a concave profile on the inside of the angle bracket 2. The angle bracket 2 according to the invention thus consists of a succession, in the longitudinal direction, of ring segments, which extend transversally and which comprise, at each of their ends, a hole, 30 and 40.

It should be noted that, because of the succession in the transversal direction of the domed portions 31, 21 and 41, which each have a radius of curvature, each of the joining areas between these domed portions The angle bracket 2 is obtained through a molding method, comprising successively an operation of superposing pre-impregnated folds in the mold, an operation of compression and exposure to particular temperature and pressure conditions related to the material being used, until polymerization. The materials used are, preferably but not restrictively, a resin such as epoxy and carbon fibers.

Thus, the reinforcing fibers follow the curvature of the various domed portions 21, 31 and 41, without failure, and in particular between the domed portions 31 and 41 that include the fastening holes 30 and 40, through the regions 21.

It will be understood that when the angle bracket 32 is subjected to forces, namely folding or unfolding forces, exerted at the level of the fastening points, these are supported from one fastening point to the next one almost exclusively by the fibers, along the longitudinal axis of the latter, so that the stress on the matrix is minimized.

Many variants, not shown, of the angle bracket 30 according to the invention may be carried out.

It is thus possible that the folding axis is not rectilinear, but curved or angulate, while preserving the same angular distance between the wings 3 and 4.

The profile of the domed portions 31 and/or 41, on the inside of the fold, may not be flat at the periphery, but maintain a determined concavity, which the resting surfaces for the securing means are adapted to.

It is also possible that the neighboring domed portions 31 and 41 are not in front of each other with respect to the folding axis, but offset obliquely with respect to the folding axis 20, depending on the specificity of the assembling to be carried out. It is also possible that the domed portions are aligned obliquely and transversally.

On the other hand, in order to increase the surface of contact with the parts to be made integral, it is possible to increase the surface of the flat coupling faces 34 and/or 44, however with a repercussion on the strength of the angle bracket 2. In order to cope with this drawback, it is however also possible to mold an element on the outer face of the wing 3 and/or 4, this element having a completely flat face aimed at resting against the part to be made integral.

What is claimed:

1. An angle bracket obtained after molding a composite material, said angle bracket comprising:
   a first wing having a plurality of first domed portions, each first domed portion having a first inner surface and a first outer surface, each first domed portion having a first concave profile on said first inner surface and a first convex profile on said first outer surface, wherein each first domed portion further comprises a first coupling region tangent to a first curvature of said first outer surface of each first domed portion, said first coupling region being a first planar connection;
   a second wing having a plurality of second domed portions, each second domed portion having a second inner surface and a second outer surface, each second domed portion having a second concave profile on said second inner surface and a second convex profile on said second outer surface, wherein each second domed portion further comprises a second coupling region tangent to a second curvature of said second outer surface of each second domed portion, said second coupling region being a second planar connection; and
   a fold spine connecting said first wing and said second wing along a folding axis, each first inner surface of each first domed portion facing a corresponding second inner surface of a respective second domed portion, said first domed portions forming a first corrugated layer along said fold spine, said second domed portions forming a second corrugated layer along said fold spine, wherein said first corrugated layer aligns with said second corrugated layer.

2. The angle bracket, according to claim 1, wherein each first coupling region aligns with an adjacent first coupling region of an adjacent first domed portion, said first planar connection and an adjacent first planar connection being aligned along said fold spine, and wherein each second coupling region aligns with an adjacent second coupling region of an adjacent second domed portion said second planar connection and an adjacent second planar connection being aligned along said fold spine.

3. The angle bracket, according to claim 2, wherein said fold spine comprises a plurality of fold spine portions, each fold spine portion having a spine inner surface and a spine outer surface, said spine outer surface being flat, said first planar connection and said adjacent first planar connection being aligned in one plane, said second planar connection and an adjacent second planar connection being aligned in one plane.

4. The angle bracket, according to claim 3, wherein said spine outer surface has a spine curvature, said first planar connection and said adjacent first planar connection being aligned along said spine curvature, said second planar connection and an adjacent second planar connection being aligned along said spine curvature.

5. The angle bracket, according to claim 3, wherein said spine outer surface is bent at an angle, said first planar connection and said adjacent first planar connection being aligned at said angle, said second planar connection and an adjacent second planar connection being aligned at said angle.

6. The angle bracket, according to claim 1, wherein each first planar connection is on a respective first outer surface of a respective first domed portion, and wherein each second planar connection is on a respective second outer surface of a respective second domed portion.

7. The angle bracket, according to claim 1, wherein each first wing is comprised of an additional plurality of first domed portions, said additional plurality forming an additional row of first domed portions, said additional row of first domed portions being aligned with said first corrugated layer, said first planar connection and each first planar connection of each first domed portion in said additional row being in one plane, and wherein each second wing is comprised of an additional plurality of second domed portions, said additional plurality forming an additional row of second domed portions, said additional row of second domed portions being aligned with said second corrugated layer, said second planar connection and each second planar connection of each second domed portion in said additional row being in one plane.

8. The angle bracket, according to claim 1, wherein said fold spine comprises a plurality of fold spine portions, each fold spine portion having a spine inner surface and a spine outer surface, said spine inner surface being concave and connecting the first and second inner surfaces of each first and second domed portions, said spine outer surface being convex and connecting the first and second outer surfaces of each first and second domed portions.

9. The angle bracket, according to claim 8, wherein each fold spine portion is aligned along said folding axis and corresponds to a respective first domed portion and second domed portion.

10. The angle bracket, according to claim 1, wherein each first planar connection is comprised of a first connecting hole, said first connecting hole having a first through axis radial to said first curvature, and wherein each second planar connection is comprised of a second connecting hole, said second connecting hole having a second through axis radial to said second curvature.

11. The angle bracket, according to claim 10, wherein each first connecting hole is planar with an adjacent first connecting hole, and wherein each second connecting hole is planar with an adjacent second connecting hole.

12. The angle bracket, according to claim 10, wherein each first planar connection is planar on an inner side facing a respective first inner surface of a respective first domed portion, and wherein each second planar connection is planar on an inner side facing a respective second inner surface of a respective second domed portion.

* * * * *